Figure 23:
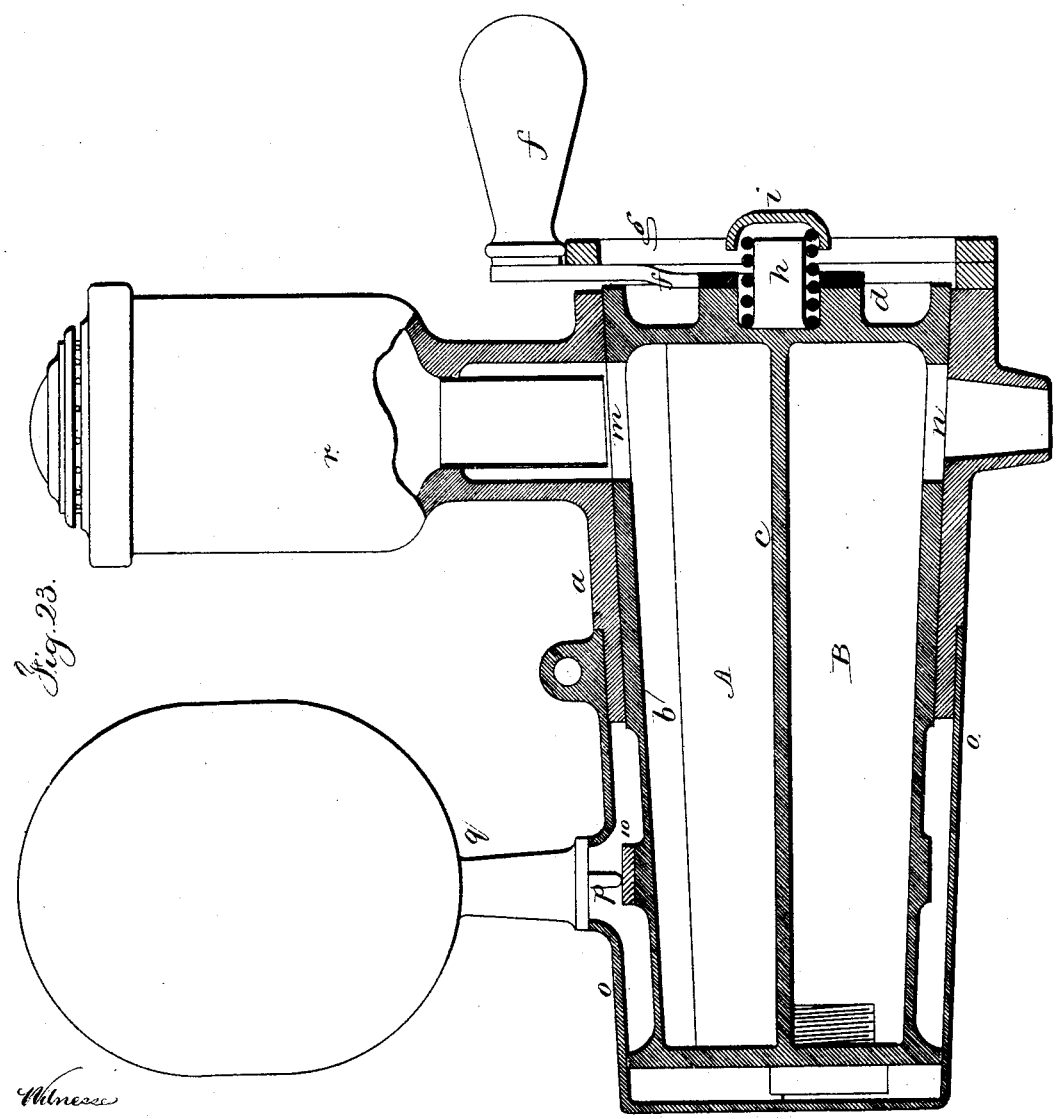

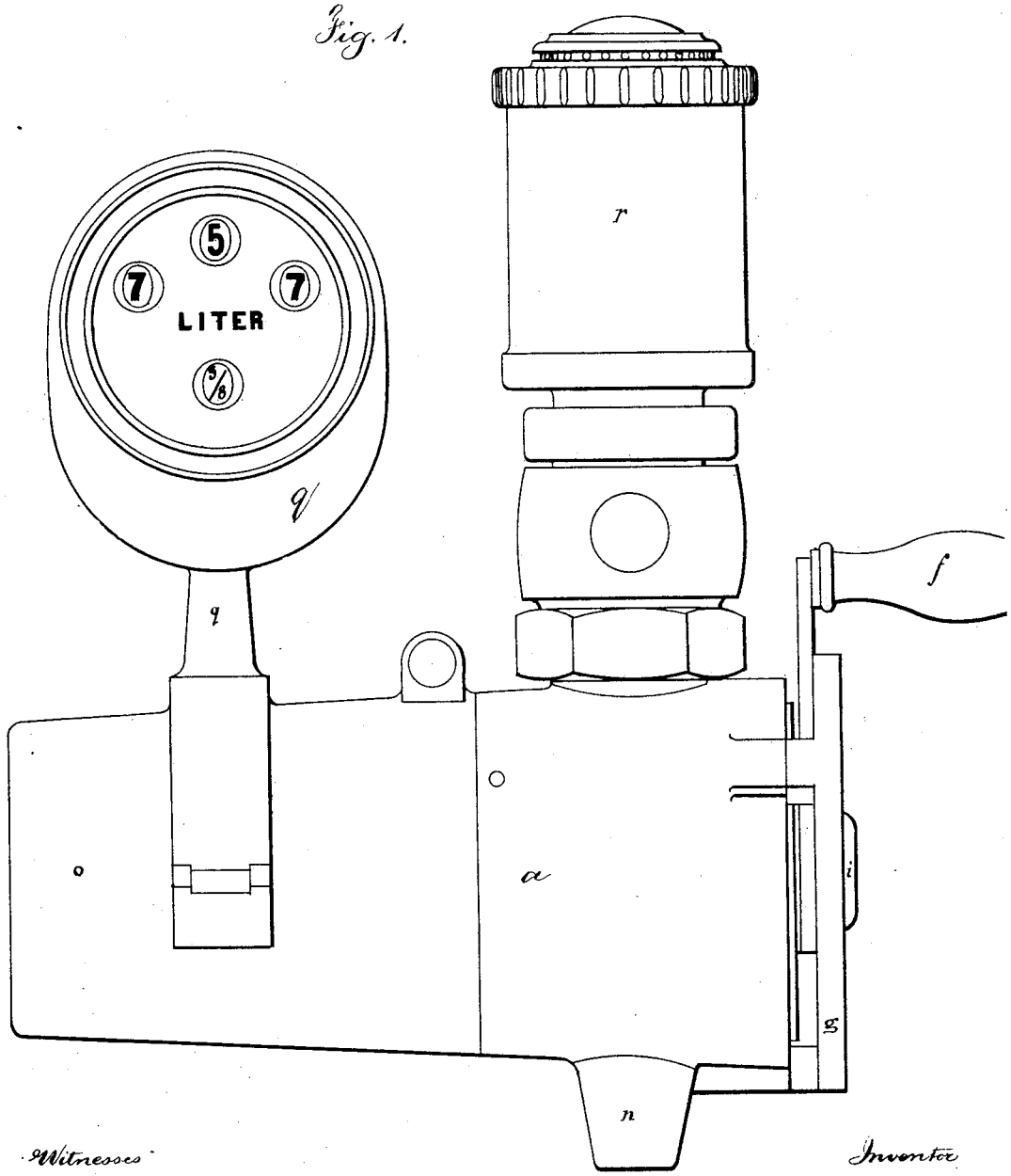

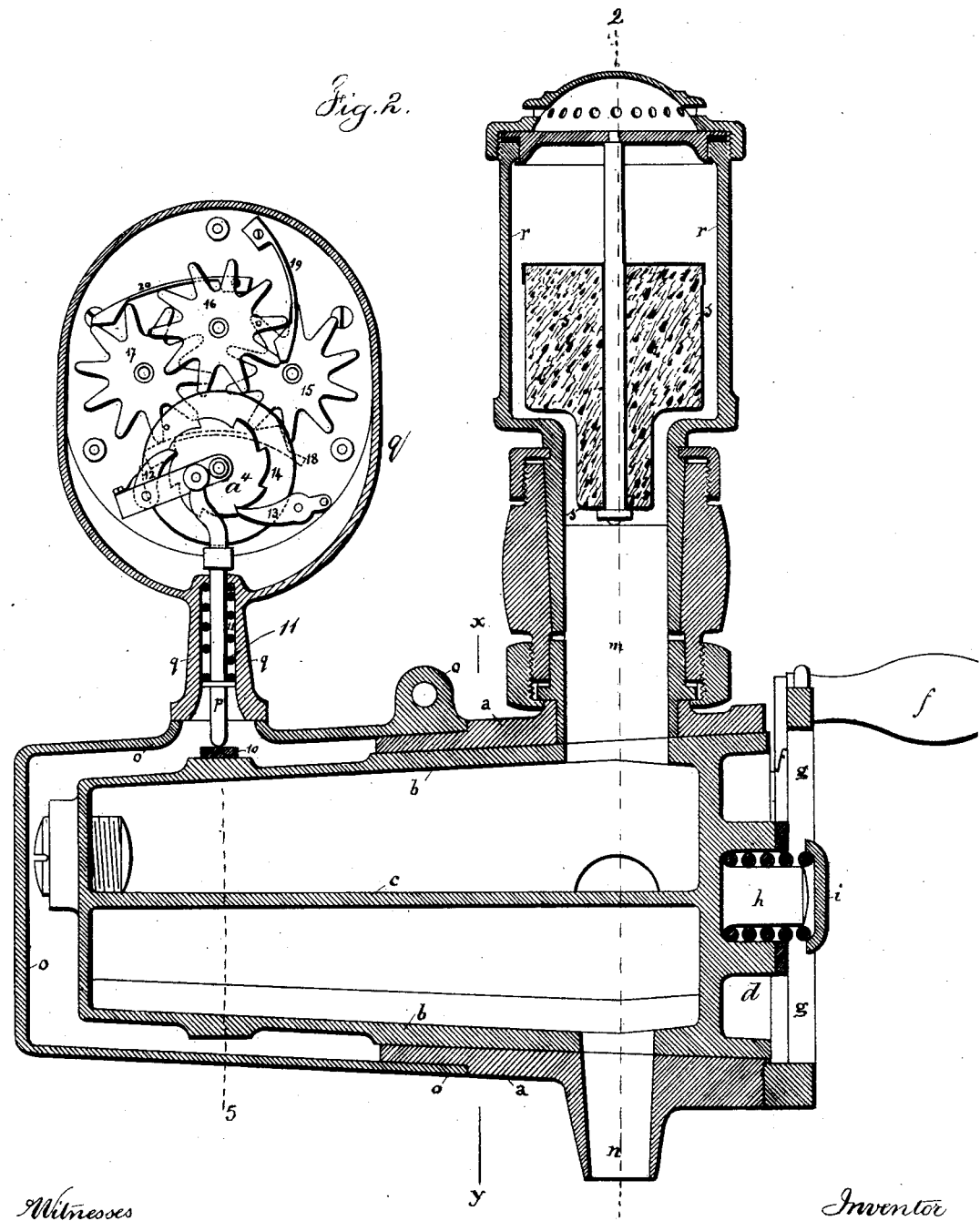

(No Model.) 8 Sheets—Sheet 3.
J. H. BLUM.
MEASURING FAUCET.
No. 252,644. Patented Jan. 24, 1882.
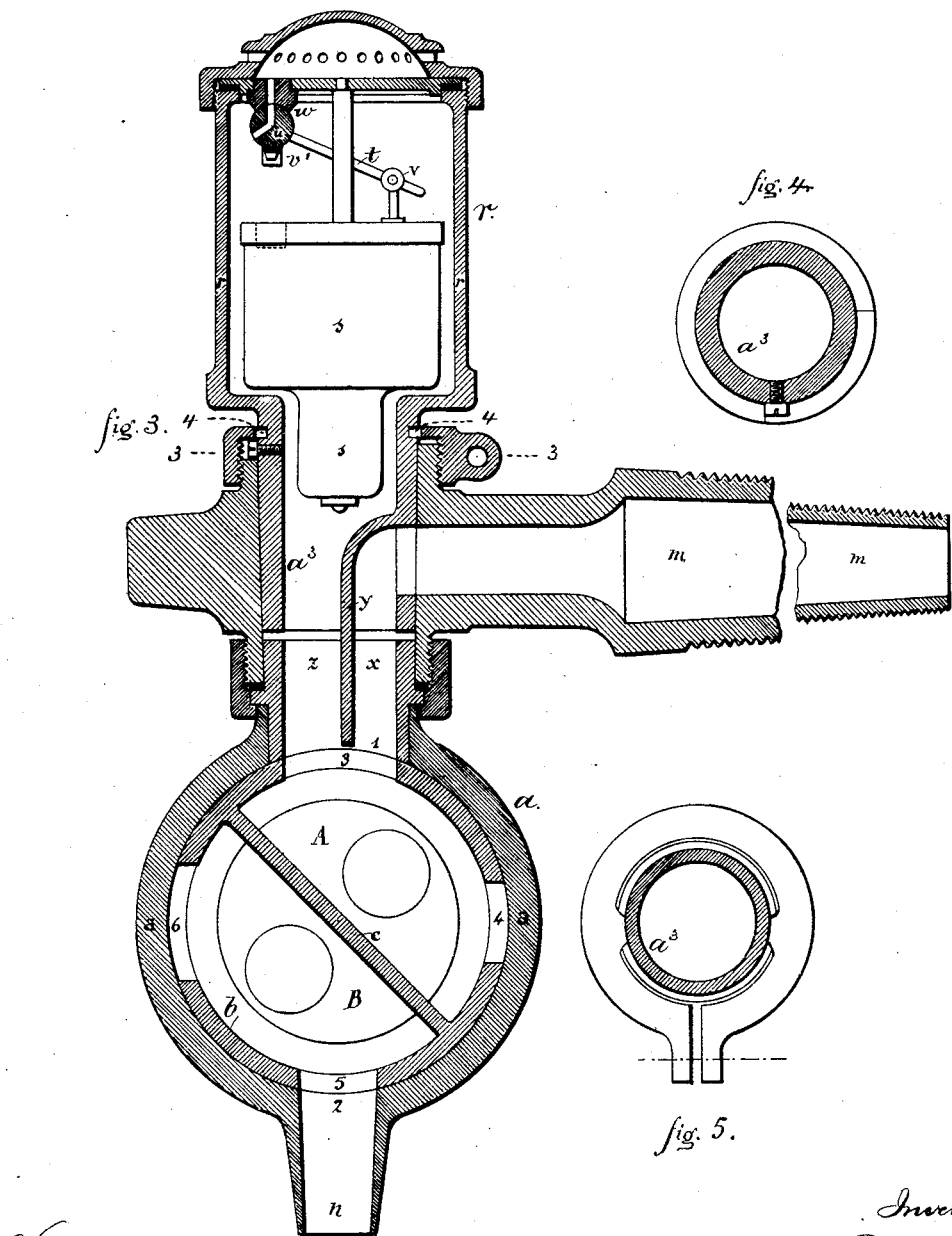

(No Model.) 8 Sheets—Sheet 4.
J. H. BLUM.
MEASURING FAUCET.
No. 252,644. Patented Jan. 24, 1882.
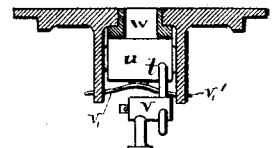
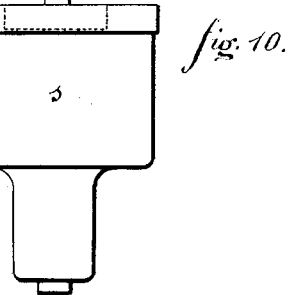
*fig. 6.*
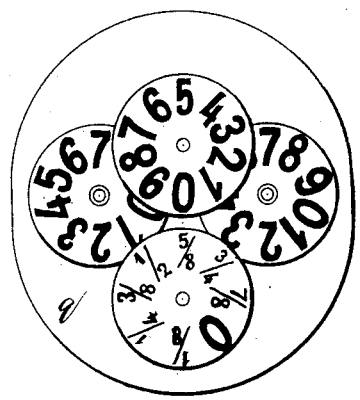
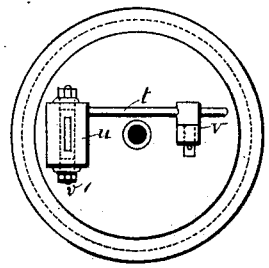
*fig. 10.*
*fig. 9.*
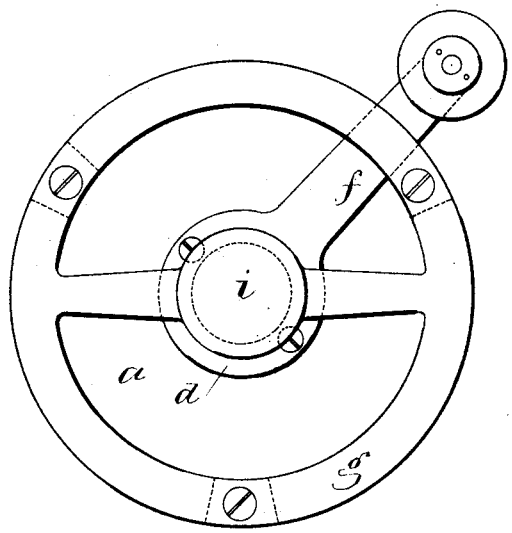
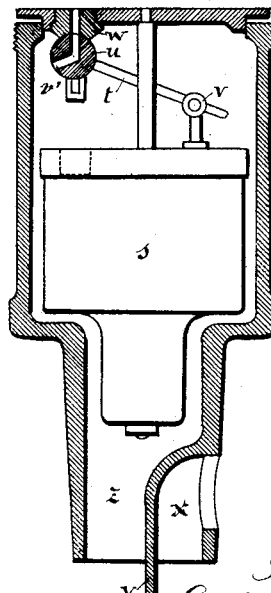
*fig. 8.*
*fig. 7*
Witnesses
Chas. H. Smith
Harold Serrell
Inventor
J. H. Blum
per Lemuel W. Serrell
atty (No Model.)
8 Sheets—Sheet 5.
J. H. BLUM.
MEASURING FAUCET.
No. 252,644. Patented Jan. 24, 1882.
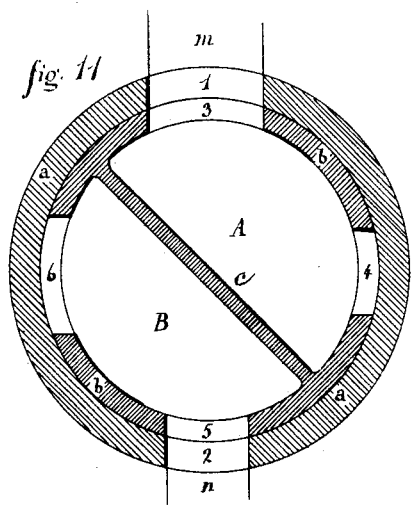
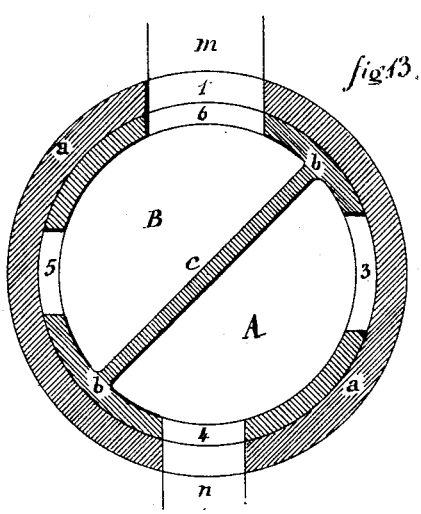
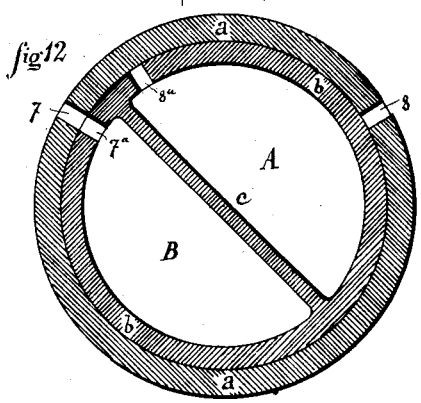
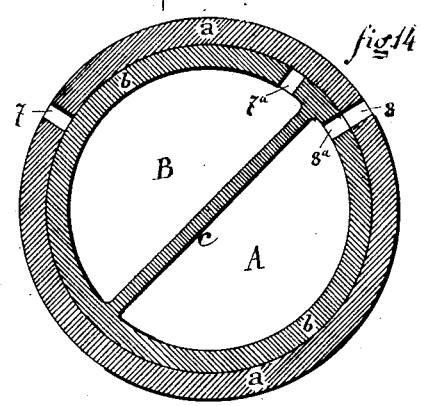
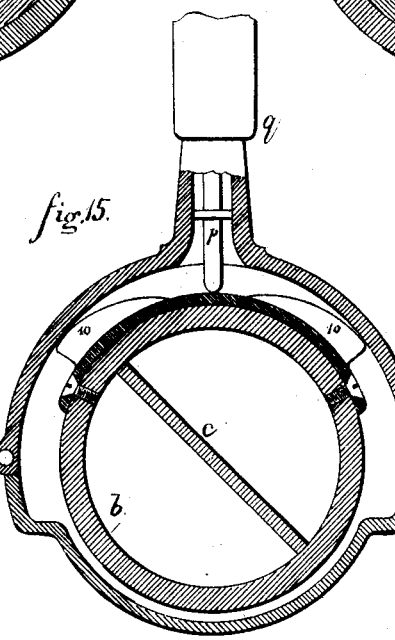
Witnesses
Chas H Smith
Harold Serrell
Inventor
J. H. Blum
per Lemuel W. Serrell
Atty.

(No Model.)  8 Sheets—Sheet 6.
J. H. BLUM.
MEASURING FAUCET.
No. 252,644. Patented Jan. 24, 1882.
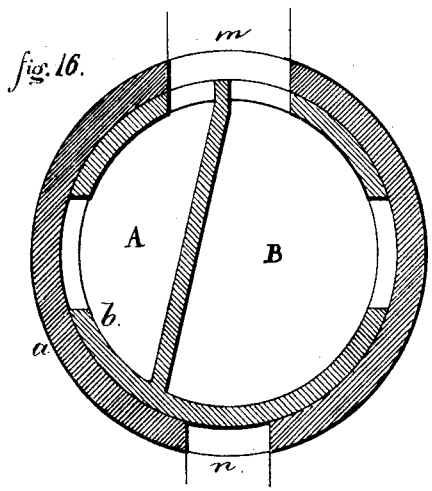
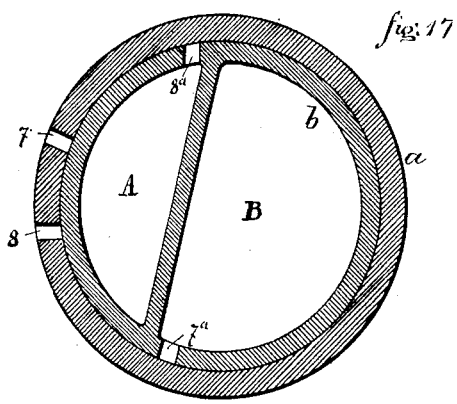
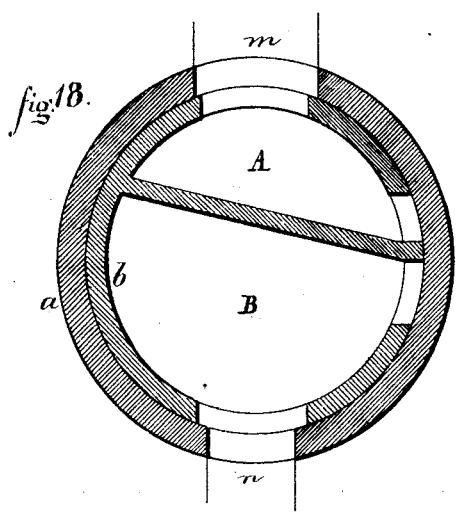
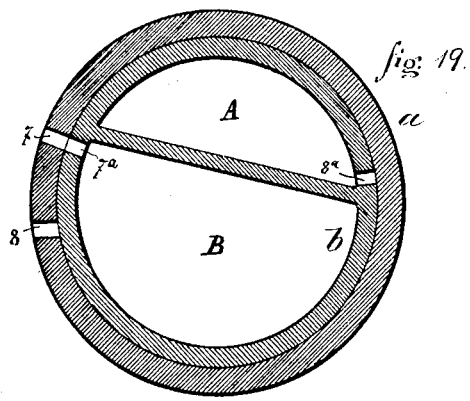
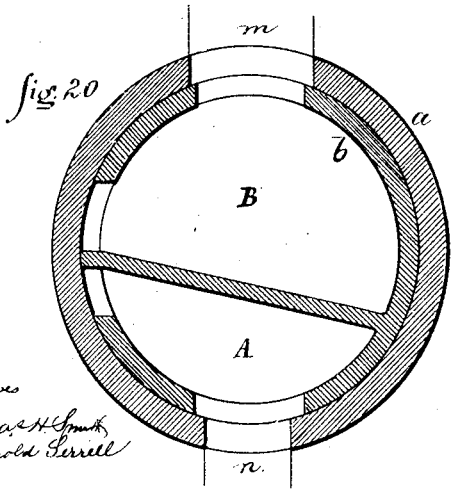
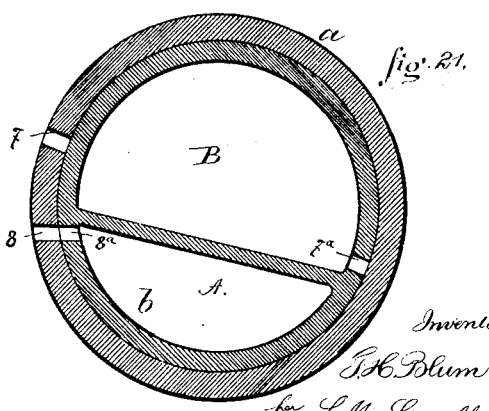

(No Model.) 8 Sheets—Sheet 7.
J. H. BLUM.
MEASURING FAUCET.
No. 252,644. Patented Jan. 24, 1882.
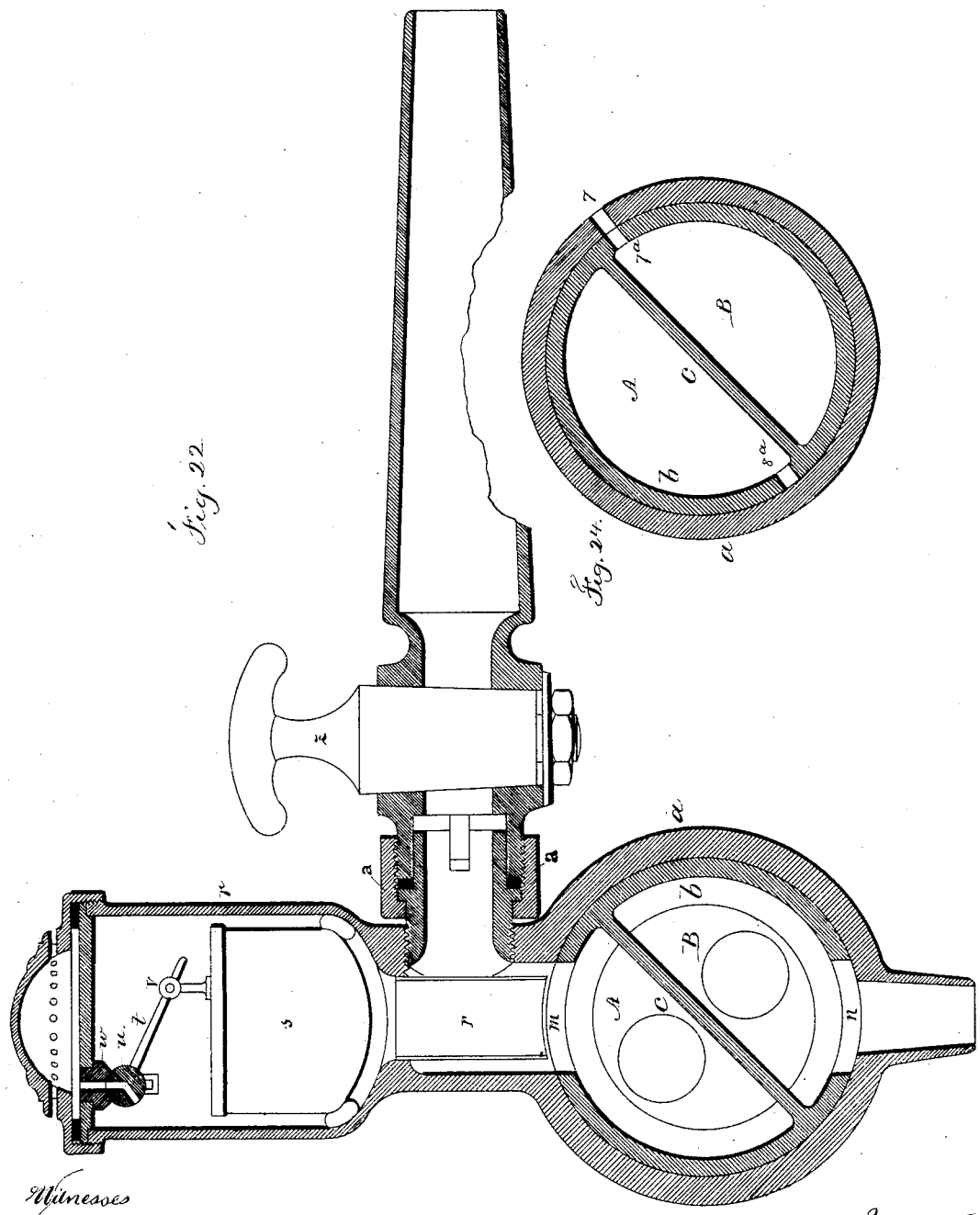
Witnesses
Chas H Smith
Harold Serrell
Inventor
J. H. Blum
per Lemuel W. Serrell
atty.

(No Model.) 8 Sheets—Sheet 8.

J. H. BLUM.
MEASURING FAUCET.

No. 252,644. Patented Jan. 24, 1882.

Witnesses
Chas. H. Smith
Harold Serrell

Inventor
J. H. Blum
per Lemuel W. Serrell
atty

UNITED STATES PATENT OFFICE.

J. HEINRICH BLUM, OF ZURICH, SWITZERLAND.

MEASURING-FAUCET.

SPECIFICATION forming part of Letters Patent No. 252,644, dated January 24, 1882.

Application filed September 16, 1881. (No model.) Patented in France November 15, 1880.

*To all whom it may concern:*

Be it known that I, J. HEINRICH BLUM, of Zurich, Switzerland, have invented a new and useful Improvement in Measuring-Faucets, (for which I have obtained a patent in France, bearing date 15th of November, A. D. 1880, No. 127,757,) of which the following is a specification.

Drawing liquids from any vessel by means of the ordinary cocks is attended with several inconveniences. It is impossible by means of the usual cock to take out of a cask or any other vessel the required quantity of liquid without a great waste of time, as the gaged measure is either exceeded, at the expense of the supplier, or falls short of the right amount, at the expense of the consumer. Moreover, in the case of oils, (petroleum and the like,) which are not usually retailed in gaged vessels, it is necessary to pour out the liquid—an unpleasant operation, which is still accompanied, as everybody well knows, with waste of time and loss of oil. A further inconvenience of the present cocks is the fact that the filling of a vessel at night can only take place with the help of a strong light; hence the danger of fire when light inflammable liquids are dealt with. Nay, in consequence of this, retailers often forbear to serve customers at night with liquids prompt to take fire. Lastly, the seller is entirely dependent on the persons in his employ, as a control of the quantity taken from a cask, especially in the case of drinkable liquids, is in most cases not possible.

The following is a description of an apparatus in the shape of a cock which removes the aforementioned inconveniences in a manner at once simple and well answering the purpose.

Figure 1 is a side view of the combined cock and meter. Fig. 2 is a vertical longitudinal section of the same. Fig. 3 is a section at the line 2 2, Fig. 2. Fig. 4 is a section at the line 3 3, Fig. 3. Fig. 5 is a section at the line 4 4, Fig. 3. Fig. 6 represents the dials of the meter. Fig. 7 is an elevation of the front of the cock. Figs. 8, 9, and 10 are detached views of the device for allowing the escape of air from the meter when filling the same. Figs. 11 and 13 are sections at the line 2 2, Fig. 2, of the plug and cock-barrel. Figs. 12 and 14 are similar views, with the parts in the same position; but the section is through the line of the air-openings in the plug and barrel. Fig. 15 is a section at the line 5, Fig. 2. Figs. 16, 18, and 20 are cross-sections of the plug and barrel, showing the hollow plug made with two chambers of unequal size, the line of section being through the supply and delivery pipes. Figs. 17, 19, and 21 are similar views of the same parts; but the line of section is through the air-openings in the plug and barrel. Fig. 22 is a longitudinal section, and Fig. 23 a cross-section, of a modified form of meter. Fig. 24 is a cross-section of the barrel and plug, Fig. 22, at the line of the air-openings.

The main feature of this liquid-meter consists of a barrel, $a$, in which a hollow plug or key, $b$, is ground, and which latter is divided by a partition, $c$, into two chambers, A and B, of equal or unequal capacity. Each of these chambers corresponds exactly to a certain determined quantity of liquid. Thus, for instance, with a cock the two chambers of which may contain half and a quarter of a liter, one can let out at will half or quarter of a liter. The cock is provided with a register, which denotes the number of fillings, with the quantity of each, and thus enables, without any trouble and with absolute certainty, the quantity of liquid drawn to be ascertained. By means of an electric current the index of the meter may also be placed at any distance whatever from the holder.

Figs. 1, 2, and 3 of the drawings represent a liquid-measuring cock with two chambers of the same capacity, each being capable of one-eighth liter.

The following requisites are essential in this apparatus: When filling the chamber or chambers of the cock the opening or openings in the hollow plug must coincide with the opening of the holder from which the liquid issues. In filling the cock means must be provided to allow the atmospheric air to escape from it. When emptying the chamber of the plug its opening must coincide with the delivery-pipe of the cock-barrel. To promote the emptying of the cock means must be provided to allow air to enter it, in order to maintain the equilibrium of pressure.

*Filling and emptying the cock.*—In the barrel $a$ are two openings, 1 and 2, which are situated diametrically opposite each other and in the same vertical plane. The opening 1 corresponds with the supply-pipe $m$ and the opening 2 with the delivery-pipe $n$. The hollow plug $b$ has in its larger inner diameter four openings, 3, 4, 5, and 6, at right angles to each other and in the same plane as those in the barrel $a$. They are separated by the partition $c$ in such a manner that each chamber has two of these openings. On the front of the plug the pin $h$ and hub $d$ are cast, to which latter the handle is secured. A ring, $g$, Figs. 2 and 7, with a central plate, $i$, is secured by screws to the body of the cock and holds the plug $b$ in place. The movement of the handle $f$ is limited by the shoulders on the ring $g$. The spring which surrounds the pin $h$ and bears against the plate $i$ presses plug $b$ into the barrel $a$. Figs. 11 and 13 show both positions of the chambered plug. In Fig. 11 the chamber A is in position for being filled through the opening 3, while at the same time the chamber B is in position to discharge through the opening 5. In Fig. 13 the chamber B is in position for being filled through the opening 6 and the chamber A is in position to discharge through the opening 4. Thus an alternate filling and emptying of each chamber is obtained. In case the chambers have an unequal capacity this arrangement is usually modified in such manner that the partition $c$ is carried through the middle of the supply-opening, Figs. 16, 18, and 20. Both chambers are now filled simultaneously, but may, if needed, be emptied singly and filled again, as it is clearly shown in Figs. 18 and 20. The handle $f$ must in this case run over a space of one hundred and eighty degrees. When the chambers are to be filled and emptied very fast those of equal capacity must be preferred.

*Entrance of the air into the chambers of the cock.*—Besides the openings already mentioned, there are in the cock-barrel two small apertures, 7 and 8, in the plane $xy$, Fig. 2, and in the same plane there are the openings $7^a$ and $8^a$ of the plug at the highest point of the chamber. The parts in Fig. 12 correspond in position with the parts in Fig. 11. In this position the chamber B is being emptied and the opening $7^a$ coincides with the opening 7 of the barrel. The air enters from without into the chamber B and allows the liquid to discharge freely. The parts in Fig. 14 correspond in position with those in Fig. 13. The chamber A is now being emptied, and the openings $8^a$ and 8 coincide and allow of the emptying of the chamber A.

*Escape of the air from the chambers during filling.*—When handling liquids rich in alcohol, which are easily volatilized, the passage of the air through the liquid-holder must be avoided and the air directly driven into the atmosphere. The cylinder $r$, Figs. 1, 2, 3, and 8, which incloses the float $s$ and the air-valve $u$, serves for this purpose. The float $s$ consists of a piece of cork fitted to move vertically upon a rod secured to the cover of the cylinder, and carries the loops through which passes the extremity of the light lever $t$, to which lever is firmly secured the air-valve $u$. The spring $v'$, Figs. 9 and 10, presses the valve against the valve-seat $w$, fixed to the cover, which is, like the air-cylinder, also provided with an opening through it. The lower part of the cylinder $r$ extends as a tube or plug, $a^3$, which is divided by a tongue, $y$, cast with it and prolonged downward, and forms two passage-ways of unequal size, $x$ and $z$, Fig. 3. This plug $a^3$ has in the division $x$ an opening corresponding with the supply-pipe $m$. By turning the cylinder $r$ in one direction or the other the opening $m$ of the supply-pipe is opened or closed. If, for instance, the chamber A is to be filled, the liquid, with the parts as in Fig. 3, will flow in through the compartment $x$ and the opening 3 in the chamber A. The air contained in the chamber will be expelled and arrive through the compartment $z$ into the cylinder $r$, and from thence through the corresponding openings of the air-valve and cover-escape. After the filling the liquid likewise rises in the compartment $z$, reaches the float, and lifts it up by means of the lever $t$, which, in consequence of the turning of the air-valve $u$, brings the air-openings of $u$ and $w$ out of line with each other, and thereby shuts off the air. As soon as the second chamber, B, is filled the compartment $z$ empties itself, the float sinks again under its own weight and opens anew the air-passages in $u$ and $w$, and the chamber A is again filled.

*Register.*—The registering apparatus is shown in Figs. 1, 2, and 6. The dials, Fig. 6, are placed on the case $q$, which incloses the registering mechanism. Upon the rear of the plug $b$ is an eccentric, 10, and as the plug is turned this eccentric gives movement to the rod $p$, which is pressed to it by the spring 11. Each time the plug is turned right or left the rod $p$ is lifted by the eccentric 10 and turns the eight-toothed ratchet-wheel $a^4$ one tooth by means of the pawl 12, which latter is brought back again by a spring. The ratchet-wheel is prevented from turning backwardly by the catch 13. The ratchet-wheel is provided with a sleeve, which revolves upon a pin firmly secured to the pillar-plate. Upon said sleeve is a disk, 14, provided with a pin. Upon rotation of the disk 14 this pin comes in contact with a tooth of the star-wheel 15 and turns that wheel one tooth. The wheels 15, 16, and 17 are all of them ten-toothed and provided with sleeves, which, like the wheel 14, revolve upon stationary gudgeons. To each of the first two star-wheels 15 and 16 is fixed a driving-pin, so that a rotation of the wheel 15 turns the wheel 16 one tooth, and similarly a rotation of the wheel 16 does the same to the wheel 17. The star-wheels are kept from rotating more than one tooth at a time by the springs 18, 19, and 20. In consequence of what has been said, after one hundred rotations of the ratchet-wheel $a^4$, for instance, the other wheels will have accomplished the number of revolutions here stated: wheel $15 = \frac{100}{10} =$ ten revolutions; wheel $16 = \frac{10}{10} =$ one revolution; wheel $17 = \frac{1}{10}$ revolution.

In order to render visible to the eye the registration of the meter, a dial is fixed upon the sleeve of each star-wheel, as shown in Fig. 6. A cover, Fig. 1, leaves the upper number of each dial freely exposed to the sight through small apertures. The three dials permit the reading of them up to 999. The number of teeth in which the ratchet-wheel is divided is proportionate to the size of both plug-chambers. For the cock represented in drawings, the chambers of which have each a capacity of one-eighth liter, it must be divided in eight teeth, and tells, consequently, at every rotation of the handle $f$, the eighth of a liter. If both chambers have an unequal capacity—for instance, one-fourth and one-eighth liter—the ratchet-wheel is likewise to be divided into eight teeth, and the eccentric must be so contrived that for the chamber of the quarters the rod $p$ must be lifted twice as high as for the chamber of the eighths, whereby the ratchet-wheel will be driven forward two divisions—viz., by two-eighths or one-quarter. In this manner the index may be adapted to any required measure.

In Figs. 22, 23, and 24 is represented a liquid-meter with separated supply-pipes. This construction affords the advantage that when the apparatus is liable to be removed the supply-pipe, with the cock $z$, may easily be unscrewed, taken off, and put up to another holder. To drive it in, a piece of wood is made use of. The plug of the cock has only two openings, $m$ and $n$. The tongue $y$ is here replaced by a pipe, $r$, which construction is perfectly suited to apparatus with chambers of unequal size.

The chief advantages which the present apparatus affords may be resumed in the following points:

First, the liquid-meter unites the greatest possible simplicity of all its parts and an unlimited durability, and can be adapted without trouble and expense to any vessel whatever.

Second, after having been used for years, it can still be relied on with the utmost confidence, because a change in the capacity of the chambers cannot possibly take place through the wearing of the working parts.

Third, its use extends to the most different kinds of liquids, if properly wrought in stoneware; also to acids, whereat there is particularly to be remarked that the air which issues from the chambers takes its way outward, and not, like in other apparatus of that kind, through the liquid itself.

Fourth, the apparatus is productive of a great saving of time and cleanliness, as the tight closing makes any dripping impossible.

Fifth, gaged vessels and lighting of a peculiar kind become useless in tapping.

Sixth, the meter affords to the owner of this apparatus a precious means of guarding against pilfering.

Having thus fully described my invention, what I claim is—

1. The liquid-measure made as a cock provided with a hollow plug which is divided into two chambers by a partition running in the plane of the long axis of the plug, substantially as specified.

2. The barrel $a$, having openings 1 2, in combination with the plug $b$, partition $c$, openings 3, 4, 5, and 6, and supply and delivery pipes, substantially as set forth.

3. The combination of the barrel $a$, with openings for water and for air, with the plug $b$, with openings for water and for air, and the partition $c$, substantially as and for the purposes set forth.

4. In combination with the barrel $a$, plug $b$, having openings therein, as set forth, for the passage of the liquid to be measured, the float $s$, and valve $u$, case $r$, and tongue $y$, for preventing the entrance of air to the holder when filling the chamber of the cock, as set forth.

5. The chambered plug $b$ and eccentric 10, in combination with the spring-rod $p$ and registering mechanism, substantially as set forth.

In testimony whereof I have signed this specification in the presence of two subscribing witnesses.

J. HEINRICH BLUM.

Witnesses:
ELMORE SCHNEIDER,
LYELL T. ADAMS.